March 20, 1934.  W. G. KIRCHHOFF  1,951,549
METHOD FOR PROCESSING DOUGH
Filed June 7, 1932  2 Sheets-Sheet 1
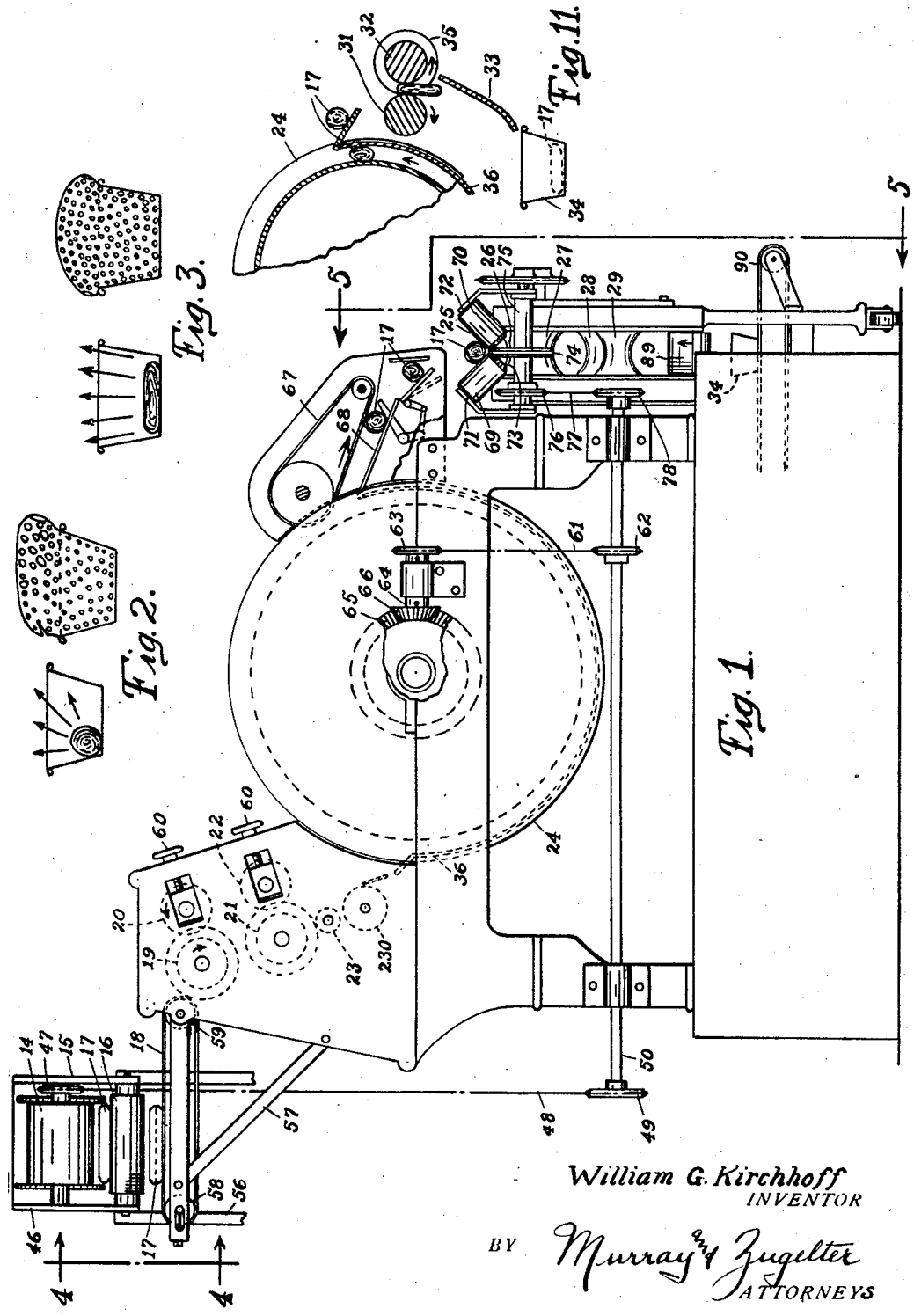
William G. Kirchhoff
INVENTOR
BY Murray & Zugelter
ATTORNEYS

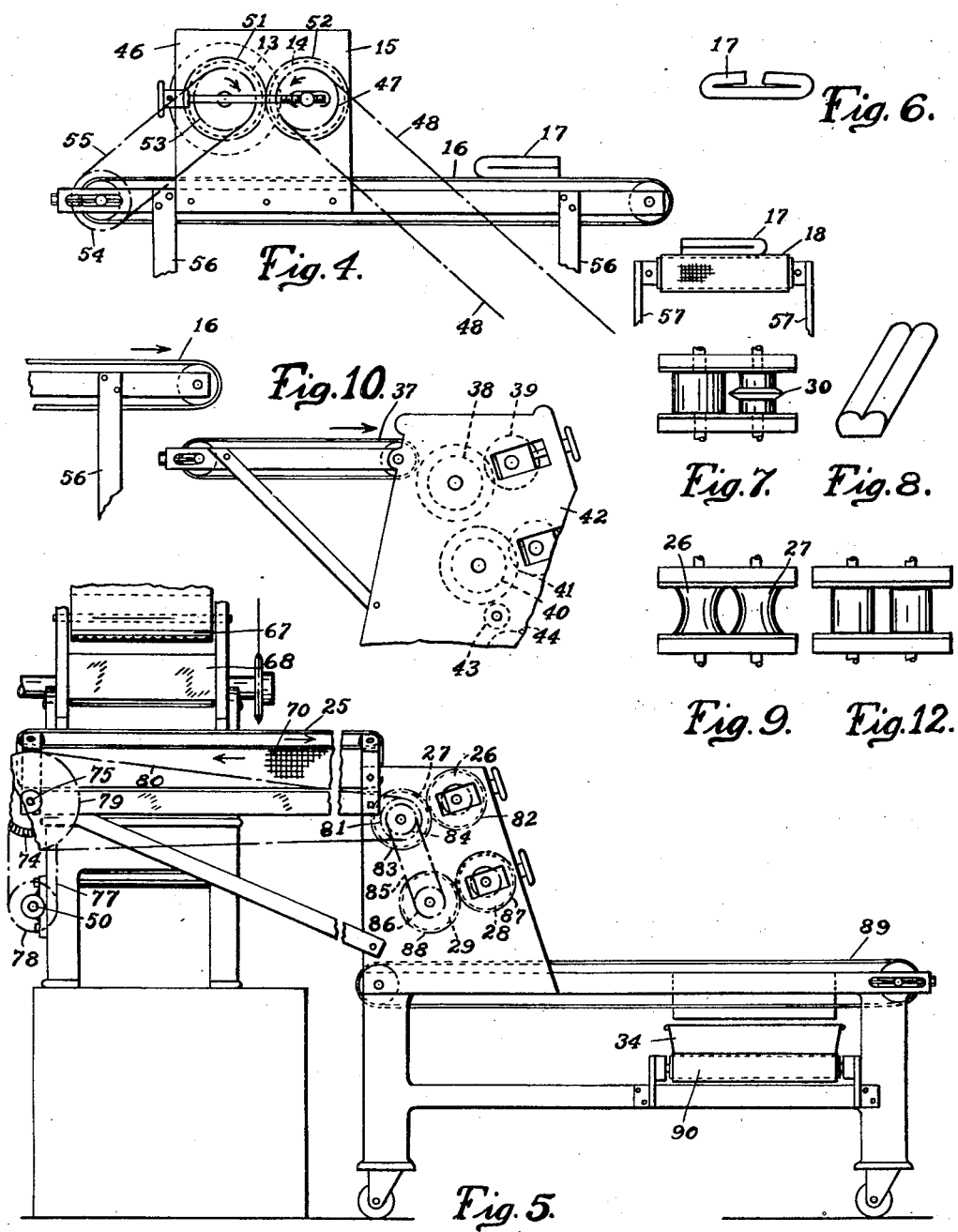

Patented Mar. 20, 1934

1,951,549

UNITED STATES PATENT OFFICE 1,951,549

METHOD FOR PROCESSING DOUGH

William G. Kirchhoff, Cincinnati, Ohio, assignor to The J. H. Day Company, Cincinnati, Ohio, a corporation of Ohio Application June 7, 1932, Serial No. 615,878

13 Claims. (Cl. 107—54)

This invention relates to a method and apparatus for processing or preparing bread and other doughs prior to baking.

Objects of the invention are to sheet and otherwise work the dough, after the dividing and rounding operation, so as to produce a loaf which will be free of large cells or air pockets, be of close and more uniform grain and have an exceedingly smooth outside skin comparatively free of breaks; to operate upon dough in such a manner as to prevent cell rupture during shaping of the loaf, and to provide apparatus for carrying out the process whereby the foregoing objects are accomplished.

The foregoing and other objects are attained by the means described herein and disclosed in the accompanying drawings, in which:

Fig. 1 is an elevational view of an apparatus comprising suitable sheeters, conveyors, curlers and a molder, whereby the method of the invention may be practiced.

Figs. 2 and 3 are diagrammatic views showing, respectively, the textures of bread loaves made in the usual manner and in the manner of this invention.

Fig. 4 is an elevational view taken on line 4—4 of Fig. 1, showing an initial sheeter.

Fig. 5 is an elevation view taken on line 5—5 of Fig. 1.

Fig. 6 is a view showing a sheet of dough folded upon itself in accordance with the new process.

Figs. 7 and 9 are top views of pairs of flattening rolls, and Fig. 8 is a perspective view of a loaf flattened and creased by the rolls of Fig. 7 ready for panning.

Fig. 10 is a side elevational view of a modified form of the structure shown in Fig. 1.

Fig. 11 is a diagrammatic view partly in cross section, showing one form of loaf panning device.

Fig. 12 shows a third form of flattening rolls.

By a comparison of the illustrations of Figs. 2 and 3, the object of this invention may most readily be understood. Fig. 2 shows the customary manner of panning an ordinary loaf of bread, and also the texture of the ordinary loaf after proofing. It will be observed that the cells are not uniform in size, and that the largest cells are congregated at the top and to one side of the loaf, resulting in pronounced "breaks" at that side of the loaf which contains the large cells or holes. In comparison with the foregoing, Fig. 3 shows how the cells are caused to remain uniform throughout the loaf, by working the dough in a certain manner about to be described, and then panning it in such a manner as to substantially cover the pan bottom. The arrows shown in Figs. 2 and 3 indicate the directions in which the dough raises during proofing and baking. By referring to Fig. 3, it is at once evident that the undesirably mis-shaped loaf of Fig. 2 will not result if the loaves are panned in such manner as to cover substantially the entire bottom of the pan. The above described panning step preferably constitutes part of the complete method of this invention whereby symmetry and also uniformity of texture and grain are secured, for producing a loaf of bread perfect in all respects.

The real reason for non-uniformity in cell structure size in dough, seems to be that the many small cells, during sheeting of the loaf, become elongated to such an extent that they break and run together to form a lesser number of large cells or gas pockets in the dough. Then, during proofing and baking of the loaf, the large cells rise to the top of the loaf and cause the undesirable condition shown in Fig. 2. It has been discovered that cell rupture and resultant formation of large cells can be prevented either by sheeting the dough gently an increased number of times to reach a given thickness, or by sheeting the dough first in one direction and then in a transverse direction of stretch, one or more times.

In accordance with the process of this invention, a divided lump or mass of dough first is sheeted between the rolls 13 and 14 of an initial sheeting device 15 whence it drops onto a conveyor 16. The rolls 13 and 14 preferably are set at a spacing of approximately $\frac{3}{32}$ inch so as to sheet the loaf gently or without unduly stretching the gas cells to the bursting point. While on the conveyor 16 the sheeted mass is folded lengthwise upon itself, either by hand or automatically, as indicated at 17 in Fig. 4. The folding could be done also in accordance with Fig. 6. After being folded upon itself end to end as explained, the resultant double-thickness sheet may automatically be given a quarter-turn by deposition thereof upon a cross conveyor 18 which carries it to the pairs of sheeting rolls 19—20 and 21—22 (Fig. 1) where it is again sheeted but in a direction transversely of the direction of stretch imposed by the initial sheeting rolls. In view of the double thickness of the folded-over dough sheet, the pair of rolls 19—20 preferably are set at a spacing somewhat greater than that of the initial sheeting rolls, or about .316 inch. The set of rolls 21—22 preferably have a spacing of about .148 inches which causes the dough to be sheeted much thinner than heretofore was possible without bursting the cells and breaking the skin of the mass. After the sheeting operation by rolls, 20—21, the mass is curled or made into a cylinder by means of the curling rolls 23—230, after which it may or may not be subjected to the rolling action of a molder drum 24. The mass of dough may be discharged either from the molder drum, or from the curling rolls direct, onto a conveyor 25 which carries the cylindrical mass to a final set of rolls 26—27 and 28—29 (Fig. 9) wherein the mass is flattened to the extent that its width approximately equals the width of a pan bottom (Fig. 3). If desired, the final rolls may be made as shown in Fig. 7, one having a central rib or creaser 30 for the production of a loaf such as is illustrated in Fig. 8. The loaf of Fig. 8, like that produced by the rolls 26—27, will be equal in width to the width of the pan bottom.

Loaves made in accordance with the above explained process will, after proofing and baking, have a uniform texture and a symmetrical formation such as is indicated in Fig. 3, rather than the usual mis-shapen form and uneven texture of Fig. 2.

In Fig. 11 is shown a modification of panning means whereby the loaves 17 after leaving the molder drum 24 drop down between a pair of flattening rolls 31—32, whence they are discharged onto a chute or conveyor 33 which automatically places the loaves in proper position on the bottom of the pan 34. The length of the flattening rolls 31 and 32 is substantially equal to the width of the molder drum, and one of the rolls may be provided with end flanges 35. The curved pressure board of the molder is represented at 36.

In a modification of the process, use is made of a conveyor 37, Fig. 10, which receives sheeted dough from the conveyor 16 of the initial sheeting means and forwards said sheeted dough to the sheeting rolls 38, 39, 40 and 41 of a molder 42. The dough sheet, in this modification, is not given a quarter turn as in the process described hereinbefore, but the various sheeting rolls are adjusted so as to apply successive gentle sheeting operations upon the dough mass. After being curled by a set of curling rollers 43—44, the curled or cylindrical mass is run through the molder and then through flattening rolls such as are disclosed in Figs. 7 or 9, after which the flattened mass is placed in pans either automatically or by hand. The sheeting rolls of the molder may be adjusted to operate on either folded or unfolded masses fed thereto by the conveyor 37.

It should readily be understood that an operator may be positioned at the conveyor 37 to fold and turn the dough sheets as they are brought to him by the conveyor 16 of Fig. 10. Although good results may be obtained by omitting from the process the molding operation performed by the large molder drum 24, it is considered preferable to include the molding operation. When the molder is omitted, the cylindrical curled loaves are advanced directly into the final flattening rolls, after which the flattened loaves are panned either automatically or by hand, as explained hereinbefore.

In practicing the method of this invention without making use of the final flattening means, the loaf after proofing and baking will be found uniform and even of texture, but the symmetry of the finished loaf will not be assured. Sheeting and re-sheeting of the dough transversely of the grain thereof may be performed one or more times, this being dependent upon the character of the dough and the degree of texture uniformity desired. The sheeting and re-sheeting operation need not be accompanied by folding-over of the sheets to secure fair uniformity of texture, but such folding-over is considered preferable and it has the advantage of keeping down the area of the dough sheets to a size at which standard machinery can conveniently accommodate them.

When the sheeting operation is performed without folding the sheets in accordance with Figs. 4 and 6, the sheeting rolls should be set or adjusted to gently roll the sheets thinner each time the sheets pass through a set of rolls, without rupturing the cells, until finally said sheets are curled into cylindrical formation. After the curling operation the loaves are subjected to the comparatively slight thinning or sheeting action of the final flattening rolls, and are then panned.

The method set forth in the preceding paragraph may include turning of the sheets a quarter turn intermediate any of the sheeting operations, or between each of them. As stated before, the molding operation need not necessarily be included, and the curling operation in that event is to be followed directly by the final slight flattening of the curled loaf preparatory to panning.

One complete apparatus whereby the above described method may be performed is illustrated in the accompanying drawings. The initial sheeting device may have its rolls 13 and 14 supported at their opposite ends by a frame 46. The roll 14 may be rotated by means of a sprocket 47 over which passes a chain 48 that passes over a driving sprocket 49 fixed on the countershaft 50. The roll 13 may be driven by means of the meshing gears 51 and 52 which are mounted for rotation with the rolls 13 and 14, respectively. The sprockets 53 and 54 and the associated chain 55 may be provided to drive the conveyor 16 from the sheeting roll 13. The initial sheeting apparatus 15 may be mounted upon a suitable frame or support 56.

The cross conveyor 18 may be mounted adjacent to the molder sheeting rolls 19—20, (Fig. 1), and if desired it may receive its support by means of stays or the like 57 which are attached to the molder frame. The cross conveyor is supported upon conveyor rollers 58 and 59.

The ordinary dough molder of Fig. 1 may conveniently be employed to provide for certain of the sheeting operations since it ordinarily includes sheeting rolls such as are shown at 19—20 and 21—22. The rolls 20 and 22 ordinarily are provided with adjusting means 60 for varying the spacing between the cooperative rolls.

The countershaft 50 may be driven by means of a chain 61 which passes over sprockets 62 and 63, the sprockets being fixed to the shafts 50 and 64, respectively. Sprocket 63 may have a geared connection 65—66 whereby rotation of the molder drum is transmitted to the countershaft 50. Any suitable means such as a motor or the like (not shown) may be employed for rotating the molder drum.

The character 67 indicates a take-off belt which may be driven in the direction of the arrow for the purpose of removing shaped masses of dough from the molder drum and directing them along a discharge plate 68, toward the conveyor 25 which carries the loaves to the final flattening rolls.

The conveyor 25 may be constituted of a pair of angularly disposed endless belts 69 and 70 which are adapted to be moved in unison in a common direction. The belts may pass over the conveyor rolls 71 and 72 each of which has fixed at its lower end a bevel pinion 73 which engages a double faced bevel gear 74 that is mounted fixedly upon a shaft 75. The shaft has fixed thereon also a sprocket 76, and which is driven by means of a chain 77 that passes over a driving sprocket 78 carried by the counter shaft 50. The conveyor 25 thereby is driven for conveying loaves to the final flattening rolls 26—27.

The roll 27 may be driven by means of a sprocket and chain power transmission 79—80—81, and by means of the cooperative meshing gears 82 and 83 on the shafts of rolls 26 and 27, respectively, the roll 26 may be rotated in a direction opposite to that of gear 27. A sprocket and chain transmission, 84—85—86, may be employed for driving the roll 29 from roll 27. The meshing gears 87—88 provide for rotation of roll 28 from roll 29.

The conveyor 89 receives the finally flattened loaves from the rolls 28—29, and from this conveyor the loaves may be lifted by hand and placed in pans 34 which rest normally upon a movable conveyor 90. The conveyers 89 and 90 may be driven by means of any suitable source of power, not shown.

It is to be understood that various modifications and changes in structural details of the mechanism may be made, within the scope of the claims, without departing from the spirit of the invention.

What is claimed is:

1. The method of processing dough consisting of submitting a mass of dough to a series of sheeting operations, and including the step of turning the sheeted mass substantially a quarter turn intermediate any two of the sheeting operations, curling the finally sheeted mass to produce a cylindrical loaf, then placing the loaf in a baking pan in a flattened condition so that it covers substantially the entire bottom of the pan.

2. The method of processing dough consisting of submitting a mass of dough to a series of sheeting operations, and including the step of turning the sheeted mass substantially a quarter turn intermediate any two of the sheeting operations, curling and molding the finally sheeted mass to produce a cylindrical loaf, then placing the loaf in a baking pan in a flattened condition so that it covers substantially the entire bottom of the pan.

3. The method of processing dough consisting of submitting a mass of dough to a series of sheeting operations, and including the step of turning the sheeted mass substantially a quarter turn intermediate any two of the sheeting operations, curling the finally sheeted mass to produce a cylindrical loaf, subjecting the cylindrical loaf to a final set of flattening rolls wherein the loaf is made oblong in cross section and of a width substantially equal to the width of a bake pan bottom, then placing the finally flattened loaf in the pan so that substantially the entire bottom of the pan is covered by the loaf.

4. The method of processing dough consisting of submitting a mass of dough to a series of sheeting operations, curling the finally sheeted mass to produce a cylindrical loaf, subjecting the cylindrical loaf to a final set of flattening rolls wherein the loaf is made oblong in cross section and of a width substantially equal to the width of a bake pan bottom, then placing the finally flattened loaf in the pan so that substantially the entire bottom of the pan is covered by the loaf.

5. The method of processing dough consisting of submitting a mass of dough to a series of sheeting operations, and including the step of folding the sheet upon itself in the direction of its grain and turning the sheeted and folded mass substantially a quarter turn intermediate any two of the sheeting operations, curling the finally sheeted mass to produce a cylindrical loaf, subjecting the cylindrical loaf to a final set of flattening rolls wherein the loaf is made oblong in cross section and of a width substantially equal to the width of a bake pan bottom, then placing the finally flattened loaf in the pan so that substantially the entire bottom of the pan is covered by the loaf.

6. The method of processing dough comprising submitting a mass of dough to a series of sheeting operations and including folding the sheet upon itself in the direction of its grain intermediate any two of the sheeting operations, curling the sheeted mass to produce a cylindrical loaf, then subjecting the loaf to a flattening means wherein the loaf is flattened sufficiently to render its width substantially equal to the width of a pan bottom on which the flattened loaf is placed.

7. The method of processing dough consisting of submitting a mass of dough to a series of sheeting operations, and including the step of turning the sheeted mass substantially a quarter turn intermediate any two of the sheeting operations, curling the finally sheeted mass to produce a cylindrical loaf, subjecting the cylindrical loaf to a final set of flattening and creasing rolls wherein the loaf is made oblong in cross section and of a width substantially equal to the width of a bake pan bottom, then placing the finally flattened and creased loaf in the pan so that substantially the entire bottom of the pan is covered by the loaf.

8. The method of processing dough consisting of submitting a mass of dough to a series of sheeting operations, curling the finally sheeted mass to produce a cylindrical loaf, subjecting the cylindrical loaf to a final flattening and creasing means wherein the loaf is made oblong in cross section and of a width substantially equal to the width of a bake pan bottom, then placing the finally flattened loaf in the pan so that substantially the entire bottom of the pan is covered by the loaf 9. The method of processing dough consisting of submitting a mass of dough to a series of sheeting operations, and including the step of folding the sheet upon itself in the direction of its grain and turning the sheeted and folded mass substantially a quarter turn intermediate any two of the sheeting operations, curling the finally sheeted mass to produce a cylindrical loaf, subjecting the cylindrical loaf to a final flattening and creasing means wherein the loaf is made oblong in cross section and of a width substantially equal to the width of a bake pan bottom, then placing the finally flattened and creased loaf in the pan so that substantially the entire bottom of the pan is covered by the loaf.

10. The method of processing dough consisting of submitting the mass of dough to a series of sheeting operations, and including the step of turning the sheeted mass substantially a quarter turn intermediate any two of the sheeting operations, curling the finally sheeted mass to produce a cylindrical loaf, passing the curled loaf through a molding machine, thereafter subjecting the cylindrical loaf to a final flattening means wherein the loaf is made oblong in cross section and of a width substantially equal to the width of a bake pan bottom then placing the entire loaf in the pan so that substantially the entire bottom of the pan is covered by the loaf.

11. The method of processing dough consisting of submitting a mass of dough to a series of sheeting operations, and including the step of folding the sheet upon itself in the direction of its grain and turning the sheeted and folded mass substantially a quarter turn intermediate any two of the sheeting operations, curling the finally sheeted mass to produce a cylindrical loaf, molding the curled loaf to elongate it and seal the ends thereof, thereafter subjecting the molded loaf to a final flattening means wherein the loaf is made oblong in cross section and of a width substantially equal to the width of a bake pan bottom, then placing the finally flattened loaf in the pan so that substantially the entire bottom of the pan is covered by the loaf.

12. The method of processing a one and one-half pound dough loaf preparatory to baking, said method comprising submitting the mass of dough to a pair of sheeting rolls spaced apart approximately $\frac{3}{32}$ inch so as to sheet the loaf gently and without unduly stretching the gas cells thereof to the bursting point, then folding the sheeted mass upon itself in the direction of stretch, thereafter turning the folded mass through substantially an arc of approximately 90° and then passing it through a pair of sheeting rolls set at a spacing of approximately .316 inch, thereafter passing the sheet between a set of rolls having a spacing of about .148 inch whereby to cause the dough to be sheeted for curling, then curling the sheet into cylindrical form, and thereafter placing the formed cylinder of dough in a baking pan in a flattened condition so that it covers substantially the entire bottom of the pan.

13. The method of processing a one and one-half pound dough loaf preparatory to baking, said method comprising submitting the mass of dough to a pair of sheeting rolls spaced apart approximately $\frac{3}{32}$ inch so as to sheet the loaf gently and without unduly stretching the gas cells thereof to the bursting point, then folding the sheeted mass upon itself in the direction of stretch, thereafter turning the folded mass through substantially an arc of approximately 90° and then passing it through a pair of sheeting rolls set at a space of approximately .316 inch, thereafter passing the sheet between a set of rolls having a spacing of about .148 inch whereby to cause the dough to be sheeted for curling, then curling the sheet into cylindrical form, subjecting the cylindrical mass to a flattening means, and thereafter placing the formed cylinder of dough in a baking pan in a flattened condition so that it covers substantially the entire bottom of the pan.

WILLIAM G. KIRCHHOFF.